(12) United States Patent
Gardner (10) Patent No.: US 11,391,418 B2
(45) Date of Patent: Jul. 19, 2022

(54) PHOTOLUMINOUS MARKER WITH TRANSPARENT COVER

(71) Applicant: William Gardner, Brooks, OR (US)

(72) Inventor: William Gardner, Brooks, OR (US)

( * ) Notice: Subject to any disclaimer, the term of this patent is extended or adjusted under 35 U.S.C. 154(b) by 30 days.

(21) Appl. No.: 17/135,470

(22) Filed: Dec. 28, 2020

(65) Prior Publication Data

US 2021/0199248 A1 Jul. 1, 2021

Related U.S. Application Data

(60) Provisional application No. 62/955,074, filed on Dec. 30, 2019.

(51) Int. Cl.
*F21K 2/00* (2006.01)

(52) U.S. Cl.
CPC .................................. *F21K 2/00* (2013.01)

(58) Field of Classification Search
CPC ......................................................... F21K 2/00
USPC ......................................................... 362/145
See application file for complete search history.

(56) References Cited

U.S. PATENT DOCUMENTS

| | | |
|---|---|---|
| 1,566,042 A | 12/1925 | Schmidt |
| 1,667,040 A | 4/1928 | Larkin |
| 1,681,073 A | 8/1928 | Welcome |
| 1,966,402 A | 7/1934 | Barringer |
| 2,072,758 A | 3/1937 | Schmeller, Sr. |
| 2,265,735 A | 12/1941 | Lambert |
| 2,278,554 A | 4/1942 | Morton |
| 2,835,937 A | 5/1958 | Hobbs |
| 2,999,280 A | 9/1961 | Miller |
| 3,334,456 A | 8/1967 | Naka |
| 3,421,274 A | 1/1969 | Balzer et al. |
| 3,557,504 A | 1/1971 | Graf |
| 3,759,000 A | 9/1973 | Balzer et al. |
| 4,001,991 A | 1/1977 | Balzer et al. |
| 4,037,374 A | 7/1977 | Balzer et al. |
| 4,058,942 A | 11/1977 | Naka |
| 4,112,641 A | 9/1978 | Balzer |
| 4,151,320 A | 4/1979 | Naka |
| 4,321,293 A | 3/1982 | Naka |
| 4,321,294 A | 3/1982 | Naka |
| 4,322,927 A | 4/1982 | Scott |
| 4,455,797 A | 6/1984 | Naka |
| 4,486,987 A | 12/1984 | Naka |

(Continued)

FOREIGN PATENT DOCUMENTS

| | | |
|---|---|---|
| EP | 1302606 A1 | 4/2003 |
| WO | WO 2008/048114 A2 | 4/2008 |

OTHER PUBLICATIONS

Office Action from the United States Patent & Trademark Office in U.S. Appl. No. 11/820,274, dated Oct. 1, 2008, 11 pages.

(Continued)

*Primary Examiner* — Christopher M Raabe
(74) *Attorney, Agent, or Firm* — Klarquist Sparkman, LLP (57) ABSTRACT

Photoluminous markers can include a photoluminescent outer surface and an inner surface configured to affix to a surface of a building element, and an overlay having an outer surface and an inner surface, the inner surface being removably coupled to a surface area of the photoluminescent outer surface of the photoluminous marker, wherein the overlay permits light emitted from the photoluminescent outer surface to be visible.

20 Claims, 6 Drawing Sheets

(56) References Cited

U.S. PATENT DOCUMENTS

| | | |
|---|---|---|
| 4,840,824 A | 6/1989 | Davis |
| 4,879,151 A | 11/1989 | Ellingson, Jr. |
| 4,893,442 A | 1/1990 | Graham et al. |
| 4,905,431 A | 3/1990 | Davis |
| 4,985,095 A | 1/1991 | Riddle |
| 5,073,430 A | 12/1991 | Aidan |
| 5,103,608 A | 4/1992 | Andreo |
| 5,357,724 A | 10/1994 | Sonoda |
| D363,785 S | 10/1995 | Davies |
| 5,461,836 A | 10/1995 | Yang |
| 5,623,804 A | 4/1997 | Kelly et al. |
| 5,840,396 A | 11/1998 | Betz |
| 5,904,017 A | 5/1999 | Glatz et al. |
| D415,289 S | 10/1999 | Dalton |
| 6,076,936 A * | 6/2000 | George .............. F21S 4/20 362/240 |
| 6,082,061 A | 7/2000 | Ryan |
| 6,101,770 A | 8/2000 | Dalton |
| 6,141,920 A | 11/2000 | Kemper |
| 6,173,540 B1 | 1/2001 | Spivey |
| 6,260,313 B1 | 7/2001 | Stegmeier |
| D447,249 S | 8/2001 | Chang et al. |
| D463,039 S | 9/2002 | Tseng |
| 6,554,446 B1 | 4/2003 | Walsh et al. |
| 6,606,827 B1 | 8/2003 | Hoffmann |
| D505,211 S | 5/2005 | Stanchfield |
| D563,565 S | 3/2008 | Gardner |
| 7,401,560 B2 | 7/2008 | McCrary |
| 8,850,757 B2 | 10/2014 | Gardner |
| 2002/0066242 A1 | 6/2002 | Hsu |
| 2002/0110682 A1 | 8/2002 | Brogan |
| 2005/0039409 A1 | 2/2005 | Sondermann |
| 2005/0198879 A1 | 9/2005 | Hannington |
| 2006/0150539 A1 | 7/2006 | Vanhastel et al. |
| 2006/0225326 A1 | 10/2006 | Robinson et al. |
| 2009/0013568 A1 | 1/2009 | Kwak |
| 2010/0018092 A1 | 1/2010 | Peckham |
| 2010/0251627 A1 | 10/2010 | Kay |
| 2012/0102799 A1 | 5/2012 | Roberts et al. |
| 2013/0145693 A1 | 6/2013 | Li |
| 2013/0199064 A1 | 8/2013 | O'Kell |
| 2016/0372014 A1 | 12/2016 | Lee et al. |
| 2020/0131779 A1* | 4/2020 | Nedza .............. B32B 27/12 |

OTHER PUBLICATIONS

Office Action from the United States Patent & Trademark Office in U.S. Appl. No. 11/820,274, dated May 27, 2009, 14 pages.
Office Action from the United States Patent & Trademark Office in U.S. Appl. No. 11/820,274, dated Dec. 24, 2009, 15 pages.
Office Action from the United States Patent & Trademark Office in U.S. Appl. No. 11/820,274, dated May 10, 2010, 16 pages.
Office Action from the United States Patent & Trademark Office in U.S. Appl. No. 13/368,699, dated Oct. 10, 2013, 20 pages.
Office Action from the United States Patent & Trademark Office in U.S. Appl. No. 13/368,699, dated Mar. 13, 2014, 18 pages.
Pages of McNichols Co. website, "Expanded Grating Stair Treads—Standard Unitread®," http://mcnichols.com/products/stairtreads/expanded/, 2006, 2 pages.
Pages of Loxcreen Company, Inc. website, "Bengard Floor Moulding—Aluminum Stair Nosing," http://www.loxcreen.com/floor/bengardfloor/floor_stairnosing.htm, 2003, 3 pages.
Statement by William Gardner regarding prior staircase nosing prototypes manufactured, dated Apr. 23, 2010, 4 pages.
Wooster Products, Inc. specification sheet for Abrasive Cast Safety Treads and Nosings—Type 100, Jan. 2005, 1 page.
Wooster Products, Inc. specification sheet for Abrasive Cast Safety Treads and Nosings—Type 101, Jan. 2005, 1 page.
Wooster Products, Inc. specification sheet for Spectra® Safety Treads—Type WP24, Oct. 2003, 1 page.
Wooster Products, Inc. specification sheet for Spectra® Safety Treads—Type WP3C, Feb. 2003, 1 page.
International Search Report and Written Opinion of PCT/US18/44880, dated Sep. 10, 2018 (6 pages).

* cited by examiner

PHOTOLUMINOUS MARKER WITH TRANSPARENT COVER

CROSS-REFERENCE TO RELATED APPLICATIONS

This application claims the benefit of U.S. Provisional Patent Application No. 62/955,074, filed Dec. 30, 2019, which is hereby incorporated by reference in its entirety.

FIELD

This disclosure relates to photoluminous markings, such as for use in building construction.

BACKGROUND

When portions of a commercial or residential building project are complete, yet the overall building project is incomplete, contractors and/or other interested parties often seek temporary occupancy in order to, for example, occupy or sell the property while remaining issues are resolved, or projects approved. Prior to the grant of occupancy, however, various ingress and egress illuminating path markers must be installed for safety. In many cases, the installation of these markings occurs prior to the completion of various projects, including the painting of the interior, resulting in their subsequent removal. However, when this occurs, the integrity of the markings is frequently left compromised or leaves the markings entirely inoperable by failing to re-adhere and/or illuminate the pathways or obstacles they were meant to demarcate.

SUMMARY

Disclosed herein are photoluminous markers that attach to surfaces and include a transparent removable covering. According to one aspect of the present disclosure, a photoluminous marker can include a photoluminescent outer surface and an inner surface configured to affix to an exposed surface, and an overlay having an outer surface and an inner surface, the inner surface being removably coupled to and overlaying a surface area of the photoluminescent outer surface of the photoluminous marker, wherein the overlay permits light emitted from the photoluminescent outer surface to be visible.

According to another aspect of the present disclosure, the inner surface of marker strip can be adhered to a movable exposed surface, wherein the movable exposed surface is incorporated into a flooring or wall material.

In further aspects of the present disclosure, the overlay can comprise a transparent film of a specified color and the photoluminescent outer surface comprises a surface color and a luminance color which is emitted from the photoluminescent outer surface, wherein the specified color of the transparent film is distinguishable from the surface color of the photoluminescent outer surface and permits the luminance color of the photoluminescent outer surface emitted through the overlay to be the same and/or similar overall luminance color as the luminance color emitted from the photoluminescent outer surface without the overlay.

According to another aspect of the present disclosure, a method can include preparing an exposed surface by removing unwanted particulates from the exposed surface; cutting a portion of the photoluminous marker having the photoluminescent outer surface and the inner surface configured to adhere to the exposed surface, wherein the overlay is removably coupled to and covers a surface area of the photoluminescent outer surface such that light emitted from the photoluminescent is visible; placing the inner surface of the photoluminous marker against the prepared exposed surface such that the photoluminous marker affixes to the exposed surface; and removing the overlay from the photoluminous marker as to expose the photoluminescent outer surface.

In further aspects, methods of the present disclosure can include applying a nontransparent substance over a surface area of the overlay such that removing the overlay removes a portion of the nontransparent substance obstructing the light being emitted from the photoluminescent outer surface.

DETAILED DESCRIPTION

Described herein are exemplary embodiments of photoluminescent articles, components thereof, and methods related thereto. The illustrated embodiments are only preferred examples and is not intended to limit the scope, applicability, or configuration of the disclosure in any way. The described embodiments may vary in function and arrangement of the elements described herein without departing from the scope of the disclosure. Any aspect of any embodiment of the disclosed technology may be combined with any other aspect of any embodiment to form combinations of features, all of which are within the scope of the inventive technology disclosed herein.

The following explanation of terms and abbreviations used herein are meant to provide a better description of the present disclosure and guide those of ordinary skill in the art in the practice of the present disclosure. The terms "includes" and "has" have the same meaning as "comprises," and the terms "including" and "having" have the same meaning as "comprising." Also, the singular terms "a," "and," and "the," mean both the singular and the plural unless the term is qualified to expressly indicate that it only refers to a singular element. That is, if two of a particular element are present, there is also "a" or "an" of such element that is present. In addition, the term "and/or" when used in this disclosure is to be construed to include the conjunctive "and," the disjunctive "or," and both "and" and "or."

Unless otherwise indicated, all numbers expressing widths, distances, and so forth, as used in the specification or claims are to be understood as being modified by the term "about." Accordingly, unless otherwise indicated, implicitly or explicitly, the numerical parameters set forth are approximations that can depend on the desired properties sought and/or limits under standard test conditions/methods. When directly and explicitly distinguishing embodiments from discussed prior art, the embodiment numbers are not approximate unless the word "about" is recited. Furthermore, not all alternatives recited herein are equivalents.

As used herein, the term "coupled" means physically, magnetically, chemically, electrically, or otherwise connected or linked, which includes items that are directly coupled and items that are coupled with intermediate elements between the coupled items, unless specifically stated to the contrary. The term "or" refers to a single element of stated alternative elements or a combination of two or more elements, unless the context clearly indicates otherwise.

Various forms of illumination are often used and/or required in both residential and commercial buildings in order to provide a certain level of safety to its occupants. For example, self-luminous products have been introduced as an alternative to traditional building safety compliance choices because they provide visibility at times when lighting or smoke reduces visibility, or when a building experiences electrical power loss. Under such conditions, these self-luminous products can help persons identify points of ingress and egress, obstacles, and/or alarm systems, such as a fire alarm. This type of self-illumination can be particularly important and frequently required, for example, when an owner or contractor seeks temporary occupancy in order to complete or resolve various tasks necessary to complete a building's construction, including painting the interior. However, because these self-luminous products are installed during temporary occupancy, they are subsequently removed in order to complete construction and/or other final tasks. This subsequent removal of the self-luminous markings often leads to failed attempts to reaffix them to their previous applied to structures and/or renders them completely inoperable and unable to illuminate. Moreover, when new self-luminous products are installed, for example, after painting, the paints typically used are low volatile organic compound paints which prevent the self-luminous productions from sticking firmly to the painted surface. This, among other things, regularly leads to the self-luminous products detaching with the paint. Thus, a self-luminous product designed to avoid removal during or after various building projects is desirable.

Figure 1:
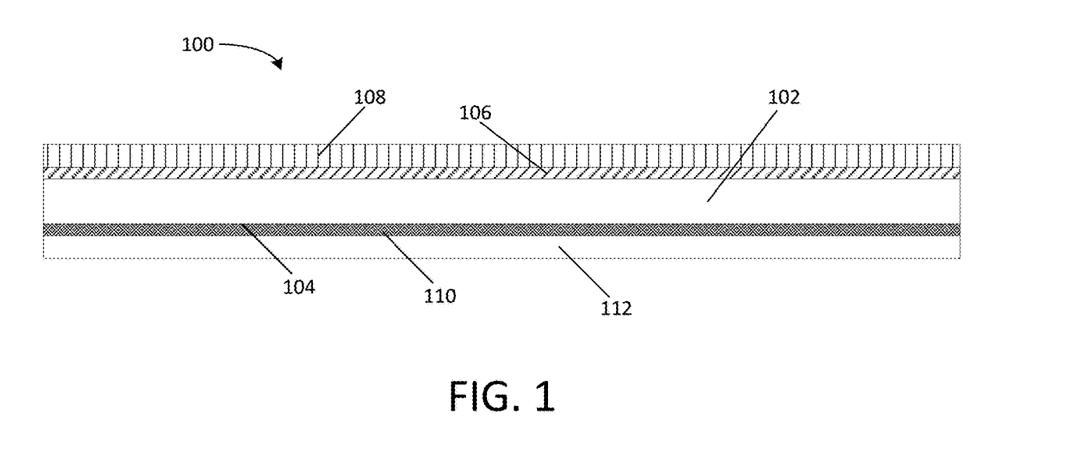
FIG. 1 is a cross-sectional view of the photoluminous marker.

The present disclosure is directed to a photoluminous marker having a photoluminescent outer surface covered by an overlay that covers and protects the photoluminescent material and permits light emitting from the photoluminescent outer surface to be visible through the overlay. FIG. 1 shows a representative photoluminous marker 100 of the present disclosure that can be utilized to mark, for example, egress and/or ingress pathways within a built structure, mark obstacles, and/or function as an alternative light source. As shown in the cross-sectional view of FIG. 1, a photoluminous marker 100 can include a material strip 102 having an inner surface 104 and a photoluminescent outer surface 106 capable of absorbing and emitting light. The photoluminous marker 100 can also include a cover or overlay 108 that covers the entire surface area and/or a portion of the surface area of the photoluminescent outer surface 106. An affixing material 110 (e.g., with optional removable liner 112) can also be deposited on the inner surface 104, which is configured to affix the photoluminous marker 100 to an exposed surface.

The photoluminescent outer surface 106 can include a photoluminescent material evenly distributed over its entire surface area (or a portion thereof) which can absorb photons from a nearby light source and emit light. Through the process of atomic photoexcitation, the photoluminescent material of the photoluminescent outer surface 106 can absorb photons of varying wavelengths emitted from one or more light sources and subsequently emit (e.g., radiate) visible light as surrounding lighting diminishes. In some instances, the photoluminescent outer surface 106 can be exposed to a light source, before and/or after installation, with sufficient lighting (e.g., of 7 lux or more) and an amount of time (e.g., for 40 minutes or more) to allow to the photoluminescent material to absorb adequate energy for subsequent light emission. In some examples, the photoluminescent outer surface is exposed to a minimum of 0.75 lux for 45 minutes or more. The photoluminescent outer surface 106 can absorb photons from a variety of light sources, including a light emitting diode, fluorescent light, white light, a halide lamp, sunlight, etc.

In some embodiments, the photoluminescent outer surface 106 can include and/or be manufactured of a photoluminescent material comprising various chemical compounds such as Strontium Aluminate (SrAl), Zinc Sulfide (ZnS), Yttrium Oxide Sulfide ($Y_2O_2S$), etc. Such materials can be classified by their visibility and duration of light emission (typically measured in lux, millicandelas, candlepower, and/or lumens per surface area). In some instances, the materials comprising the photoluminescent outer surface 106 can allow the photoluminous marker to emit light for 90 minutes or more in the absence of ambient light to meet the specifications for a number of applications. However, the photoluminous marker may emit light for any duration. Further, the photoluminescent material can be chosen to emit any color and/or have any combination of color pigments to meet required specifications and/or demands for particular aesthetic qualities. For example, the photoluminous marker 100 can include a photoluminescent outer surface 106 having pigments of one or more different colors to indicate or distinguish structural obstructions or particular pathways (e.g., photoluminous marker 708 of FIGS. 7A-7B).

The material strip 102 of the photoluminous marker 100 can comprise a rigid and/or flexible material. For example, the material strip 102 of the photoluminous marker 100 can comprise a rigid material such as PVC, aluminum, acrylic, and/or a flexible material, including polyester, vinyl, PVC, etc. The photoluminescent material may be deposited on the surface of the material strip 102 and/or included within its chemical and/or physical composition.

Still referring to FIG. 1, the inner surface 104 can comprise and/or have deposited on its surface an affixing material 110 as to affix the photoluminous marker 100 to an exposed surface. In some examples, the affixing material 110 can be a pressure sensitive adhesive that can provide a uniform and confined bonding area, allowing for quick surface bonding of the inner surface 104 to a surface. The affixing material 110 can cover the entire surface area of the inner surface 104 or any portion thereof. In some instances, the photoluminous marker 100 can be affixed to a surface through other means of affixing material, such as nails, screws, pins, hook-and-loop fasteners, tacks, etc., alone or in combination with an adhesive.

The affixing material 110 at the inner surface 104 can also include a removable liner 112 that allows the photoluminous marker 100 to be effectively stored and to provide a peel-and-apply adhesive for easy and consistent installation. The removable liner 112 of the inner surface 104 for instance, can be removed such that the photoluminous marker 106 can be coupled to an exposed surface of a building element to form a marker system. A building element can be any physical part of a built structure, including but not limited to flooring, doors, door frames, windows, beams, columns, vertical partitions (e.g., permanent or temporary wall structures), or a variety of other building elements. Building elements can also include those objects or elements that are configured to be combined with other building elements, such as those configured to be coupled to or inlaid within a material making up another element.

Figure 2:
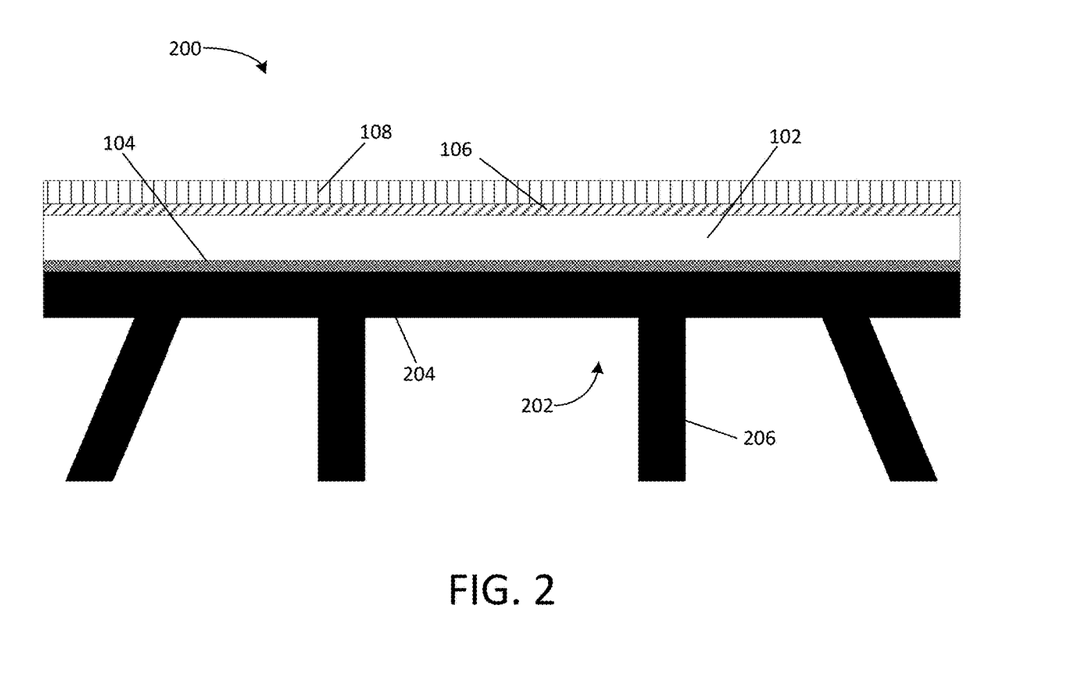
FIG. 2 is a cross-sectional view of the path marking inlay.

FIG. 2 shows a building element can include a material inlay 202 that is configured to be embedded within another building material and/or substance, such as concrete, steel, or wood. As shown in FIG. 2 the material inlay 202 can include a base 204 having one or more surfaces, one or more projections 206 outwardly extending from the base 204, and be combined with the photoluminous marker 100 as to form a photoluminous material inlay 200. The photoluminous material inlay 200 can be manufactured and/or assembled as to affix the photoluminous marker (e.g., of FIG. 1) to a first surface of the base 204 of the material inlay 202, where the projections 206 extending outwardly from a second surface of the base 204 are intended to be inlaid within, for example, a concrete surface such that the path marking inlay 200 is embedded within the concrete. In some embodiments, the base 204 and/or projections 206 of the material inlay 202 can have any shape, form, length, or other characteristic which allows the photoluminous material inlay 200 to be coupled to a particular building element or material comprising the building element. In some examples, the photoluminous marker 100 can include and/or be assembled in combination with a variety of other building elements to be attached and/or fixed to a built structure, such as premanufactured treads, frames, stair nosings, handrail systems, and/or other precast products.

The photoluminous marker 100 can also include an overlay 108 that covers the photoluminescent outer surface 106 and permits light emitted from the photoluminescent outer surface 106 to be visible under low light conditions. In some embodiments, the overlay 108 can include any transparent and/or translucent polymer, film, vinyl, PVC, polyethylene, polypropylene, etc., which permits light emitted from the photoluminescent outer surface 106 to be visible. In particular embodiments, the overlay 108 can be a transparent or translucent film of any color such that the color of the film is distinguishable from the color of photoluminescent outer surface 106 but permits the luminance color emitted through the overlay 108 to be the same and/or similar overall color as the luminance color emitted from the photoluminescent outer surface 106 without the overlay 108. For example, the overlay 108 can have a blue-like color such that the overlay 108 is distinguishable from a light-yellow color of the photoluminescent outer surface 106 (e.g., to indicate what portion of the surface area is covered by the overlay 108) but permits the same and/or similar yellow-green luminance color emitted from the photoluminescent outer surface 106 without the overlay 108 to be emitted through the overlay 108.

Figure 3:
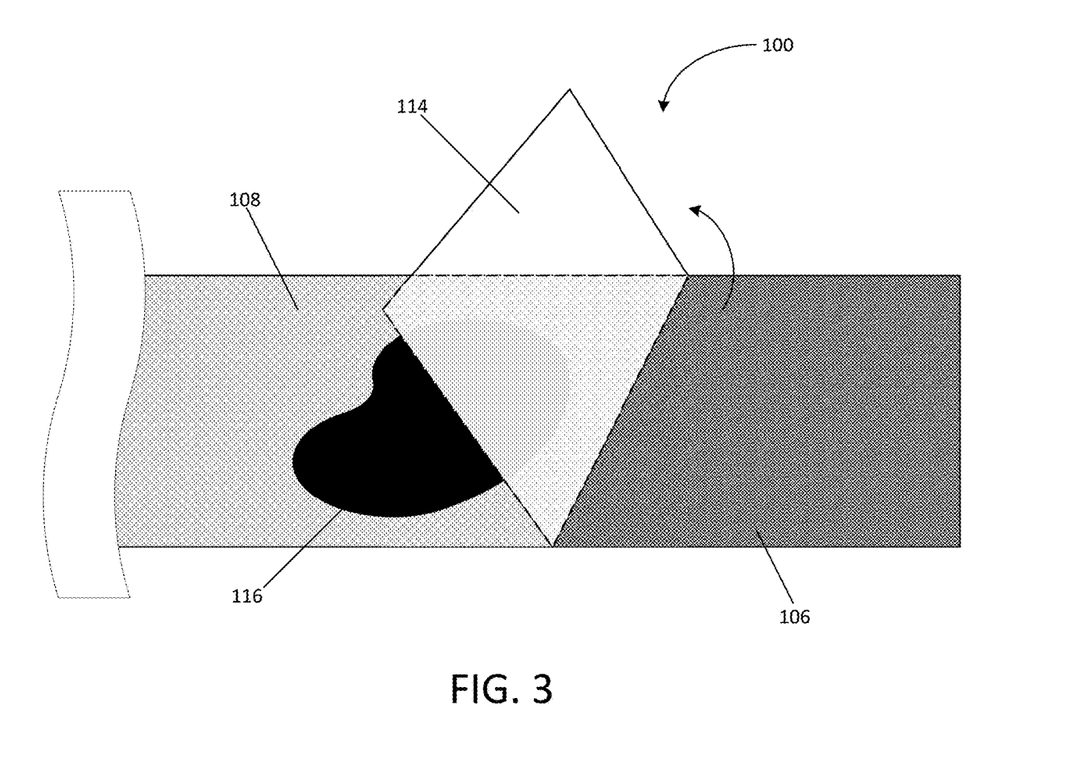
FIG. 3 is a perspective view of the overlay of the photoluminous marker being removed.

As shown in FIG. 3, the overlay 108 can be removably coupled to the photoluminescent outer surface 106. For example, the overlay 108 can be affixed to the photoluminescent outer surface 106 and fully and/or partially removed by peeling (or pulling) away the overlay 108 as to expose the photoluminescent outer surface 106 and an inner surface 114 of the overlay 108. As the overlay 108 is removed, it also removes the obstructions 116, such as paint, dirt, plaster, etc., deposited on its surface which can prevent or obstruct light (or portion of the light) emitted from the photoluminescent outer surface 106. The obstruction 116 may be, for example, paint covering a surface area of the photoluminous marker 100 such that the light emitted from the photoluminescent outer surface 106 and through the overlay 108 is obstructed. The paint then can be removed by removing the overlay 108 as to expose a neat surface of the photoluminescent outer surface 106. This allows the paint or any other obstruction on the surface of the overlay 108 to be removed without having to move, remove or deinstall the photoluminous marker 100 of the present disclosure.

In some embodiments, the overlay 108 can include a low binding adhesive, such as a low tack adhesive distributed on the inner surface 114, which allows the overlay 108 to be removed with ease and/or repositioned or reapplied across a surface area of the photoluminescent outer surface 106. In other embodiments, the overlay 108 can be made of a material which permits the overlay 108 to be removably coupled to the photoluminescent outer surface 106. For example, the photoluminescent material of the photoluminescent outer surface 106 (or other portion of the photoluminous marker 100) and the material comprising the overlay 108 can have material characteristics such that the two are affixed to one another without any intermediate components and/or materials.

Figure 4:
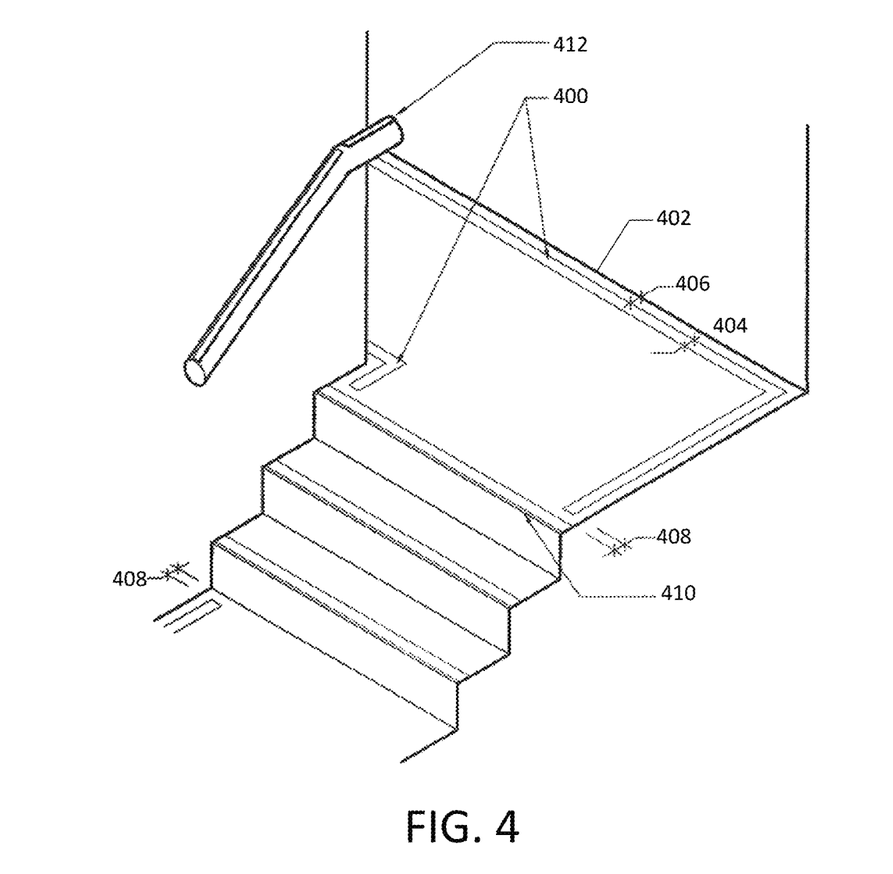
FIGS. 4 and 5 show various placements of the photoluminous marker along a hallway, staircase, and a handrail.

Now referring to FIGS. 4-7, the photoluminous marker 100 can be placed in particular positions and coupled to building elements as to form, for example, luminescent demarcation lines within a built structure to indicate ingress and egress pathways, including under little or no illumination. For example, the photoluminous marker 400 can be positioned and affixed to a building element such as flooring just beyond an intersection 402 of a vertical partition (e.g., a wall structure) and the adjoining floor such that an individual is able to navigate around the corner and down the steps shown in FIG. 4, via light emitted by the photoluminescent outer surface 400 through the overlay (e.g., overlay 108 of FIGS. 1-3). As shown in FIG. 4, the photoluminous marker 400 can have a width 404 and be spaced from the intersection 402 by a distance 406 such that the positioning of the photoluminous marker can meet certain regulations and/or aesthetic demands. In some examples, the photoluminous marker can have a width 404 ranging from 0.5 inches to 5 inches and be spaced from the intersection 402 by a distance 406 ranging from 0.5 inches to 5 inches.

In some instances, the photoluminous marker 400 can be affixed to the flooring above and/or below a staircase and spaced at a distance 408 from a respective step. In further examples, the photoluminous marker 400 can be positioned and affixed to the nosing 410 (and/or other placement) of one or more steps by being affixed to the surface of the stair itself and/or by being coupled to a stair tread, for example. The photoluminous marker 400 can, for example, be affixed to a stair tread in a similar fashion to the path marking inlay of FIG. 2. In further examples, the photoluminous marker 400 can be positioned and affixed along a longitudinal axis of a handrail 412, demarcating its positioning and orientation.

Figure 5:
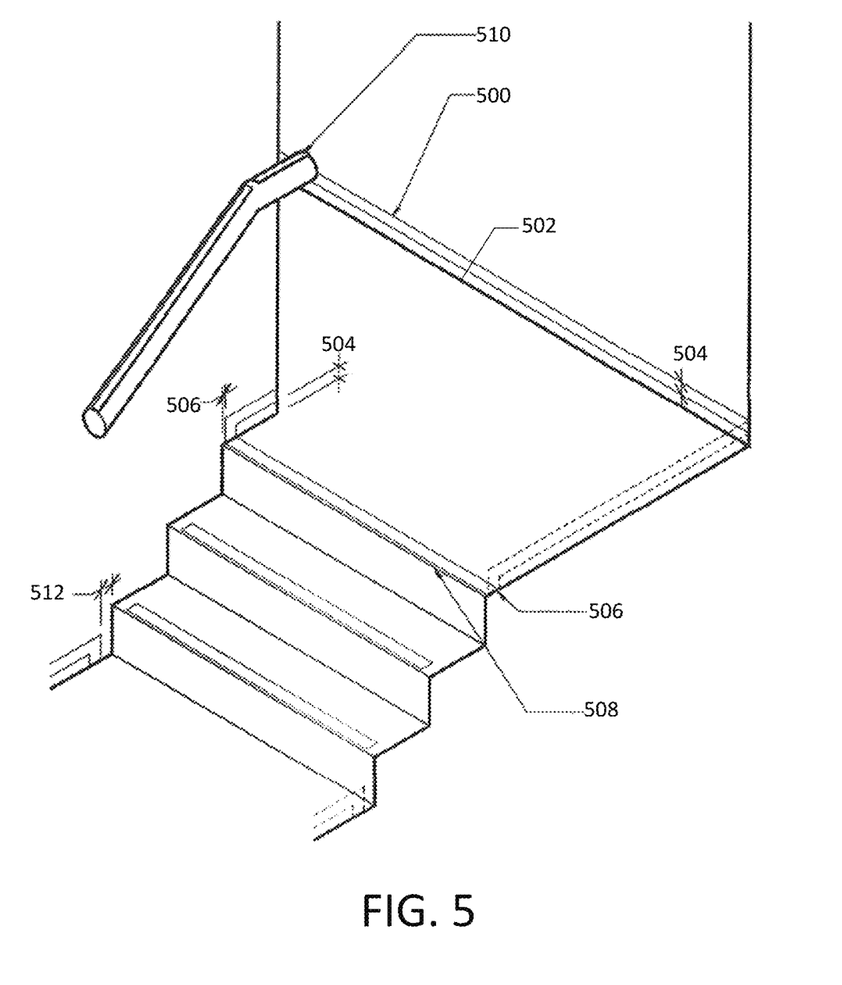

In additional examples, as shown in FIG. 5, the photoluminous marker 500 can be positioned and affixed to the vertical partition (e.g., the wall) and spaced just beyond the intersection 502 by a distance 504 (e.g., ranging from 0.5 inches to 5 inches). In some instances, the photoluminous marker can be positioned and affixed to the vertical partition such that it runs downward as to, or appear to, connect at 506 with another portion of the photoluminous marker positioned on the nosing 508 of the stairs. In some examples, the photoluminous marker 500, in similar fashion as in FIG. 4, can be positioned and affixed along a longitudinal axis of handrail 510 and/or be spaced at a distance 512 from one or more proximate stairs.

Figure 6A:
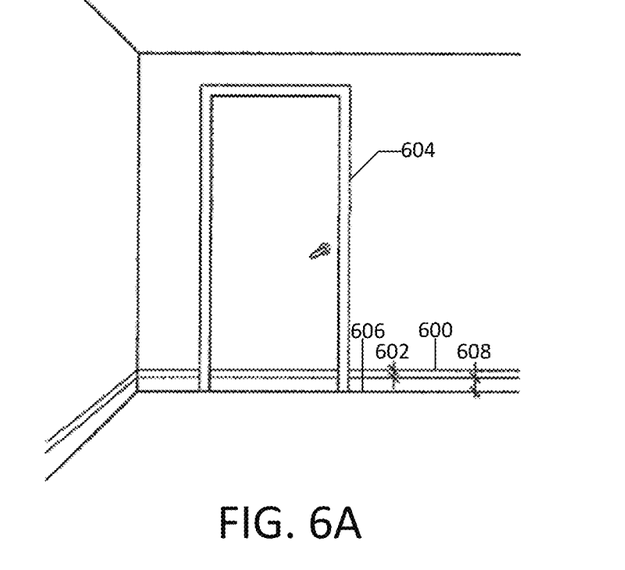
FIGS. 6A-6B show various placements of the photoluminous marker along a doorway.
Figure 6B:
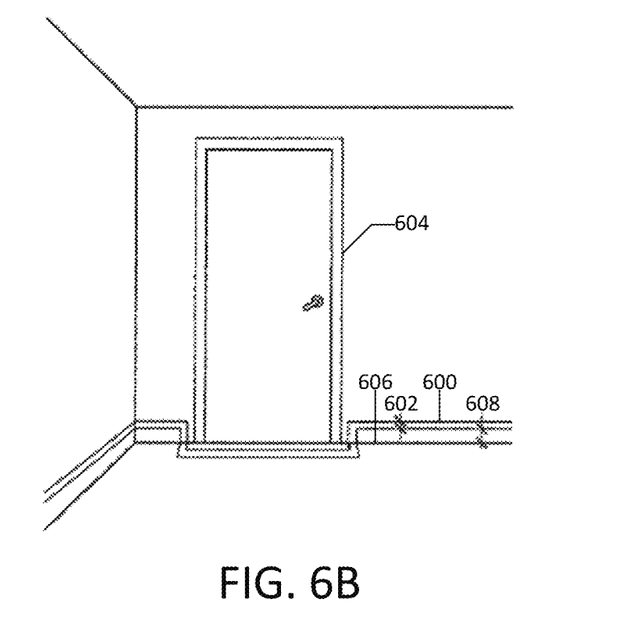

Referring now to FIGS. 6A-6B, the photoluminous marker 600, in the same manner as FIGS. 4 and 5, can have a width 602 (e.g., ranging from 0.5 inches to 5 inches) and be positioned and affixed to the vertical partition and flooring (or combination thereof) to demarcate a doorway 604.

For example, as shown in FIG. 6B, the photoluminous marker 600 can be spaced from the intersection 606 by a distance 608 (e.g., ranging from 0.5 inches to 5 inches) and positioned to run down onto the flooring, around the doorway 604, and back up the vertical partition on the other side of the doorway. As shown in FIG. 6A, the photoluminous marker can also span across the entire width (or length) of the doorway.

Figure 7A:
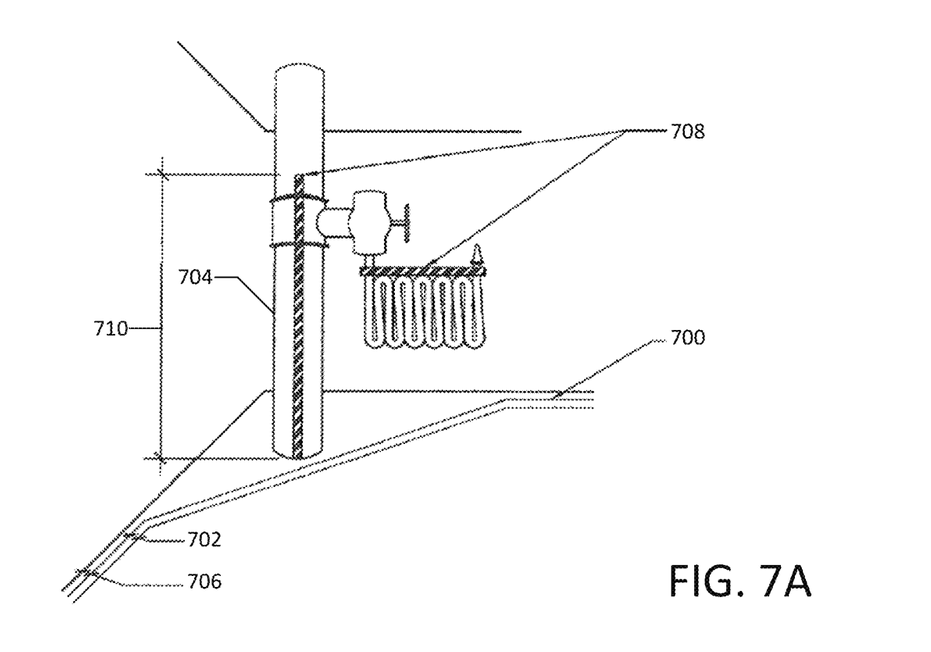
FIGS. 7A-7B show various placements of the photoluminous marker along a hallway including an obstacle and rail.
Figure 7B:
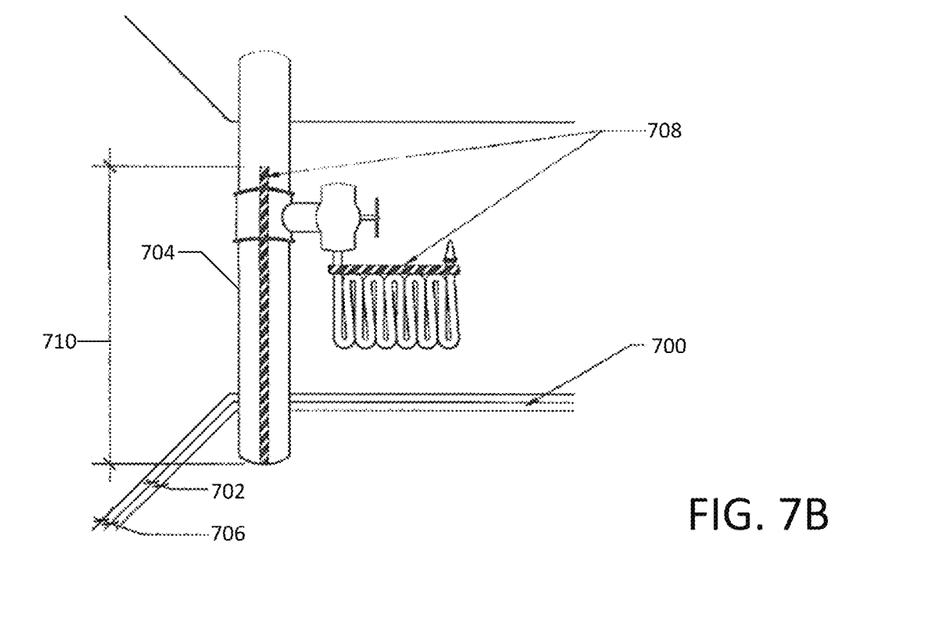

Turning to FIGS. 7A-7B, the photoluminous marker 700 can have a width 702 (e.g., ranging from 0.5 inches to 5 inches) and be positioned an angle relative to the intersection 706. For instance, as shown in FIG. 7A, a section of the photoluminous marker 700 is positioned at an angle relative to the intersection 706 and affixed to the flooring such that the marker crosses in front of an obstruction 704, while other sections of the photoluminous marker 700 extend parallel to the intersection. Alternatively or additionally, the photoluminous marker can extend behind the obstruction 702 (e.g., FIG. 7B) while being spaced from the intersection at a distance 706. In some examples, the spacing or distance 706 ranges from 0.5 inches to 5 inches. In the further examples, and as described herein, the photoluminous marker 708 can include two or more colors as to indicate an obstruction or safety measures, for example, the obstruction 704. In some examples, the photoluminous marker 708 (e.g., similar in function to photoluminous marker 700) can run along a longitudinal axis of an obstruction 704 at a length 710. The length 710 in such instances can range from 1 foot to 10 feet.

Accordingly, the photoluminous marker described herein can be applied to a building element prior to or during completion of surrounding construction. For instance, surrounding construction (e.g., painting, drywalling, framing, etc.) occurring on the same floor and/or within the same built structure. When applied, the photoluminous marker can be relied upon to provide additional or emergency lighting indicating egress, ingress, obstructions, and/or emergency exits and tools (e.g., first aid kits, alarms, water, etc.). Near, at, or after completion of the surrounding construction, the overlay covering of the photoluminous marker can be removed such that debris, paint, dust, or other obstructions on the surface of the overlay collected during surrounding construction are removed and cleared from the photoluminous marker. The result is a clean and unmarked photoluminous marker which can continue to provide emergency or other lighting without the need for removal or reapplying the marker post construction.

In should be noted that the photoluminous marker of the present disclosure can have any dimension and is not limited to the proportions shown in the drawings. For example, adhesives, films, and rigid materials can have various weights, widths, heights, thicknesses, or lengths. The overlay and/or removable liner can also have various widths, heights, or lengths. Additionally, although spacings are specified to describe the placement of the photoluminous marker, these are simply by way of example, and the photoluminous marker can be spaced at any distance in relation to any physical structure.

In view of the many possible embodiments to which the principles of the disclosed present disclosure may be applied, it should be recognized that the illustrated embodiments are only preferred examples of the disclosed technology and should not be taken as limiting the scope of the invention. Rather, the scope of the invention is at least as broad as following claims. I therefore claim as my invention all that comes within the scope of these claims and their equivalents.

The invention claimed is:

1. A method comprising:
   adhering an inner surface of a photoluminous marker to a building element via an adhesive deposited on the inner surface, the photoluminous marker having a photoluminescent outer surface, and an overlay covering a surface area of the photoluminescent outer surface and configured such that light emitted from the photoluminescent outer surface is visible through the overlay, wherein the overlay is removably coupled to the photoluminescent outer surface; and
   removing the overlay from the photoluminescent outer surface such that the photoluminescent outer surface is exposed.

2. The method of claim 1, wherein the method further comprises:
   applying the photoluminous marker to the building element prior to completion of surrounding construction such that the photoluminescent outer surface emits visible light through the overlay while the overlay protects the photoluminescent outer surface during surrounding construction.

3. The method of claim 1, wherein the method further comprises:
   relying on the photoluminous marker for emergency lighting during surrounding construction.

4. The method of claim 1, wherein the method of removing the overlay comprises removing the overlay from the photoluminescent outer surface after completion of surrounding construction such that the photoluminescent outer surface is exposed and clear of any obstruction deposited on the overlay during surrounding construction.

5. The method of claim 1, wherein the light emitted by the photoluminescent outer surface when the overlay is removed is greater than the light emitted by the photoluminescent outer surface when the overlay is removably coupled to the photoluminescent outer surface.

6. The method of claim 1, wherein the method further comprises exposing the photoluminous marker to a light source such that the photoluminescent outer surface is configured to emit light.

7. The method of claim 4, wherein the photoluminous marker is exposed to 0.7 lux or greater of light.

8. The method of claim 4, wherein the photoluminous marker is exposed to the light source for 40 minutes or more.

9. The method of claim 1, wherein adhering the inner surface of the photoluminous marker to the building element comprises adhering the photoluminous marker to the building element proximate a seam formed by an intersection of a vertical partition and a flooring.

10. The method of claim 9, wherein the photoluminous marker is positioned parallel and/or perpendicular to the seam formed by the intersection of the vertical partition and the flooring.

11. The method of claim 9, wherein the photoluminous marker is positioned at an angle relative to the seam formed by the intersection of the vertical partition and the flooring.

12. The method of claim 9, wherein the building element is the vertical partition, the flooring, or a combination thereof.

13. The method of claim 1, wherein the building element comprises a step, and wherein adhering the inner surface of the photoluminous marker to the building element comprises adhering the photoluminous marker proximate an edge of the step.

14. The method of claim 13, wherein the photoluminous marker is parallel and/or perpendicular to the edge of the step.

15. A marker system comprising:
a building element; and
a photoluminous marker having a photoluminescent outer surface, an overlay removably coupled to the photoluminescent outer surface, and an inner surface coupled to the building element, wherein the overlay is configured such that light emitted from the photoluminescent outer surface is visible through the overlay.

16. The marker system of claim 15, wherein the photoluminescent outer surface comprises two or more photoluminescent pigments.

17. The marker system of claim 15, wherein the overlay is a transparent film, a translucent film, or a combination thereof.

18. The marker system of claim 15, wherein the building element is configured as a material inlay and comprises a base having a first outer surface, a second outer surface, and one or more projections extending outwardly from the second outer surface, wherein the photoluminous marker is coupled to the first outer surface.

19. The marker system of claim 16, wherein the overlay comprises a first color, and the photoluminescent outer surface comprises a second color and a luminance color, wherein the first color of the overlay is different from the second color of the photoluminescent outer surface, and the overlay is configured such that the luminance color emitted by the photoluminescent outer surface through the overlay is the luminance color emitted by the photoluminescent outer surface when the overlay is removed.

20. The marker of claim 15, wherein the building element is a tread, a stair nosing, a handrail, a door frame, a flooring material, or a wall structure.

\* \* \* \* \*